United States Patent [19]

Sato et al.

[11] 4,411,958
[45] Oct. 25, 1983

[54] MAGNETIC RECORDING MEDIUM

[75] Inventors: Masami Sato; Yasutoshi Okuzawa; Noburo Hibino, all of Odawara, Japan

[73] Assignee: Fuji Photo Film Co., Ltd., Kanagawa, Japan

[21] Appl. No.: 314,342

[22] Filed: Oct. 23, 1981

[30] Foreign Application Priority Data

Oct. 24, 1980 [JP] Japan .............................. 55/149133

[51] Int. Cl.$^3$ .............................................. H01F 10/00
[52] U.S. Cl. .................................. 428/457; 428/694; 428/900
[58] Field of Search ............................... 427/127–132, 427/48; 428/900, 694, 337, 457

[56] References Cited

U.S. PATENT DOCUMENTS 4,322,474  3/1982  Matsuura et al. .................. 427/128

Primary Examiner—Bernard D. Pianalto
Attorney, Agent, or Firm—Sughrue, Mion, Zinn, Macpeak & Seas

[57] ABSTRACT

A magnetic recording medium comprising a base and a magnetic layer formed thereon is disclosed. The coefficient of friction ($\mu_B$) of the surface opposite to the magnetic layer in transversal direction against the axial direction of loading post is under the straight line represented by the formula: $\mu_B = 0.1 S_{TD} - 0.05$ (wherein $S_{TD}$ is the stiffness of the medium in transversal direction and $0.5 < S_{TD} \leq 6.0$), and the total thickness of the medium is $15.5\mu$ or less.

2 Claims, 3 Drawing Figures

MAGNETIC RECORDING MEDIUM

FIELD OF THE INVENTION

This invention relates to a magnetic recording medium, and more particularly, to a recording medium suitable for long-time recording which is made highly resistant to tape damage.

BACKGROUND OF THE INVENTION

There is generally a limit on the diameter of a magnetic tape pack for video tape recorders. Therefore, in order to increase the amount of information that can be recorded, the magnetic tape is desirably made as thin as possible. However, if the tape is made thin, its mechanical strength becomes inadequate, and because of low "stiffness" or high stretchability the tape becomes susceptible to tape damage during running on video tape recorders.

The video tape is caused to run in contact with the fixed magnetic head, drum, guide poles, etc., so it is required to have low friction coefficient. Tapes having high friction coefficient cause large tension while they are running on the video tape recorder and are highly susceptible to tape damage. The term "tape damage" as used herein means the elongation and deformation of the magnetic tape, as well as the bending of the side edges of the tape that take place in recording or reproducing mode. The tape damage is caused during normal running but it is very likely to occur during loading or unloading. There are two types of video tape recorders, beta-type and VHS-type, and the occurrence of tape damage is more frequent in the VHS-type. The bending of the side edges of the tape easily occurs in a video tape recorder that uses loading posts having an acetal copolymer coating and which is a winding torque of about 300 g/cm or more during unloading. The bending occurs in the loading post assembly on the supply side as shown in FIG. 1 which is a schematic representation of a video tape recorder, and the direct cause of such bending is the rising or lowering of the tape at the loading post. The loading post is in contact with the surface opposite to the magnetic layer of the tape. The tape damage is a cause of skew, jitter and poor sound reproduction, and the tape bent at either side edge achieves very poor results in recording and reproducing modes.

SUMMARY OF THE INVENTION

Therefore, one object of this invention is to provide a magnetic recording medium which is highly resistance to tape damage.

To achieve this object, we have tested several magnetic tape samples whose thickness was not more than 15.5 μm and found that those whose coefficient of friction ($\mu_B$) against the loading post on the side opposite to the magnetic layer with respect to the base was small and which had large stiffness in the transversal direction ($S_{TD}$) were highly resistant to tape damage and had long durability.

DETAILED DESCRIPTION OF THE INVENTION

According to our finding, a magnetic tape not thicker than 15.5 μm has greatly improved resistance to tape damage if the coefficient of friction ($\mu_B$) of the surface opposite to the magnetic layer in transversal direction against the axial direction of loading post is in the area where it smaller than the value of $\mu_B$ on the straight line represented by the following formula (this is indicated by the partially hatched area of FIG. 3):
$\mu_B = 0.1 S_{TD} - 0.05 (0.5 < S_{TD} \leq 6.0)$. Preferably, $\mu_B$ is not more than 0.30.

Figure 1:
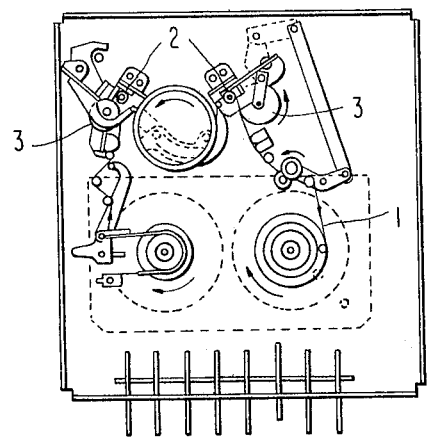
FIG. 1 is a schematic representation of a video tape recorder, wherein 1 is a magnetic tape, 2 is a loading post, and 3 is an impedance roller.
Figure 2:
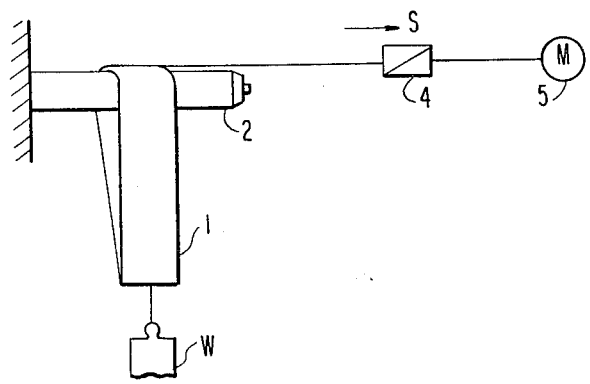
FIG. 2 is a schematic representation of the method for measuring the stiffness of a magnetic tape in the transversal direction ($S_{TD}$), wherein 1 is a magnetic tape (sample), 2 is a loading post, 4 is a resistance strain type strain gauge, and 5 is a drive motor.

The term "the surface opposite to the magnetic layer" as used herein means the surface opposite to the magnetic layer, say, the reverse face of the base, or if there is a coating on the base, say a back coating, the terms means the surface of said coating. The symbol $\mu_B$ represents the frictional coefficient of a magnetic tape ½ inch wide that is measured according to the method shown in FIG. 2 by pulling the tape in contact with the loading post at a touch angle between 190 and 195 degrees under a load (W) of 200 g at a tape speed (S) of 0.5 mm/sec at 25° C. and r.h. 65%. The frictional coefficient $\mu_B$ is represented by F/W (wherein F is the tensile stress and W is the load). The tape stiffness in transversal direction ($S_{TD}$) is a value as measured by a stiffness meter of Tinus Olsen Testing Machine Co., Inc., Willow Grove, Penna., U.S.A. in accordance with ASTM D 747-70 wherein six sample tapes ½ inch wide and ½ inch long put one on another between a clamp and a loading plate spaced by a distance of 0.14 inch are bent by 20 degrees and the value indicated by the meter is read. The maximum bending moment is set at 0.005 inch-1 bs, and the measuring atmosphere is 25° C. and r.h. 65%.

To produce a thin tape, a thin base must be used. To obtain a tape whose total thickness is 15.5μ or less, a base having a thickness between 9 and 11μ is used. The commonly employed PET base serves the purpose, and a base of high elasticity having high mechanical strength is desired. However, if the PET base it too elastic it undergoes great thermal shrinkage and may cause curling, so a PET base having suitable elasticity should be used. For example, a PET base whose $F_1$ value is about 5.5 kg/mm² in both transversal and longitudinal directions is preferred. Using such a PET base, magnetic recording tape samples with a back coating and having a total thickness of not more than 15.5μ were prepared. All of them had an $S_{TD}$ of 6.0 or less.

Any method can be used to decrease the frictional coefficient ($\mu_B$) of the surface opposite to the magnetic layer and to increase the tape stiffness in transversal direction ($S_{TD}$). For instance, the frictional coefficient ($\mu_B$) of the surface opposite to the magnetic layer is generally decreased by forming a lubricant coating or a back coating on the surface opposite to the magnetic layer, and the formation of a back coating is particularly effective.

Details of the method for preparing the coating solution of magnetic layer are given in Japanese Patent Publication Nos. 15/60, 26794/64, 186/68, 28043/72, 28045/72, 28046/72, 28048/72, 31445/72, 11162/73, 21331/73, 33683/73, and Russian Pat. No. 308,033. The magnetic coating solutions described in these prior art references mainly consist of a ferromagnetic powder, a binder and an organic coating solvent, and they may optionally contain an additive such as a dispersant, lubricant, abrasive or antistat.

The ferromagnetic powders that can be used in this invention include fine particles of ferromagnetic iron oxide, fine particles of ferromagnetic chromium oxide and ferromagnetic alloy particles. The ferromagnetic iron oxide has the general formula FeOx wherein x is in the range of $1.33 \leq X \leq 1.50$, i.e., maghemite ($\gamma$-Fe$_2$O$_3$, x=1.33), magnetite (Fe$_3$O$_4$, x=1.50) and Berthollide compounds of maghemite and magnetite (FeO$_x$, $1.33 < X < 1.50$). The value x is represented by the following formula:

$$x = \frac{1}{2} \times \{2 \times \text{(atomic percent of divalent iron)} + 3 \times \text{(atomic percent of trivalent iron)}\} \times \frac{1}{100}$$

These ferromagnetic iron oxides may contain a divalent metal. Examples of the divalent metal include Cr, Mn, Co, Ni, Cu and Zn, and they are contained in an amount of 0 to 10 atomic percent of the iron oxide.

The ferromagnetic chromium dioxide is CrO$_2$ which optionally contains not more than 20 wt% of a metal such as Na, K, Ti, V, Mn, Fe, Co, Ni, Tc, Ru, Sn, Ce or Pb, a semiconductor such as P, Sb or Te, or oxides of these metals.

The particles of these ferromagnetic iron oxides and chromium oxides are acicular and the ratio of length to breadth is in the range of from about 2/1 to 20/1, preferably at least 5/1, and the effective average length is in the range of from about 0.2 to 2.0 μm, preferably from 0.3 to 1.5 μm.

The ferromagnetic alloy particles have a metal content of at least 75 wt%. At least 80 wt% of the metal content is made of at least one ferromagnetic metal (i.e., Fe, Co, Ni, Fe-Co, Fe-Ni, Co-Ni or Co-Ni-Fe), and not more than 20 wt%, preferably between 0.5 and 5 wt%, of the metal content is made of Al, Si, S, Sc, Ti, V, Cr, Mn, Cu, Zn, Y, Mo, Rh, Pd, Ag, Sn, Sb, Te, Ba, Ta, W, Re, Au, Hy, Pb, Bi, La, Ce, Pr, Nd, B, or P. The ferromagnetic alloy particles may contain a small amount of water, hydroxide or oxide.

Specific examples of the fine ferromagnetic particles are mentioned in Japanese Patent Publication Nos. 5515/61, 4825/62, 5009/64, 10307/64, 14090/69, 18372/70, 22062/72, 22513/72, 28466/71, 38755/71, 4286/72, 12422/72, 17284/72, 18509/72, 18573/72, 39639/73, U.S. Pat. Nos. 3,026,215, 3,031,341, 3,100,194, 3,242,005, 3,389,014, British Pat. Nos. 752,659, 782,762, 1,007,323, French Pat. No. 1,107,654, and West German Patent Application (OLS) No. 1,281,334.

The binder for magnetic coating solution to be used in this invention is a known thermoplastic resin, thermosetting resin (or reactive resin) or a mixture of these resins. Suitable thermoplastic resins have a softening point of less than 150° C., an average molecular weight of about 10,000 to 200,000, and a degree of polymerization of about 200 to 2,000. Examples of such polymers are vinyl chloride/vinyl acetate copolymer, vinyl chloride/vinylidene chloride copolymer, vinyl chloride/acrylonitrile copolymer, acrylic acid ester/acrylonitrile copolymer, acrylic acid ester/vinylidene chloride copolymer, acrylic acid ester/stryene copolymer, methacrylic acid ester/acrylonitrile copolymer, methacrylic acid ester/vinylidene chloride copolymer, methacrylic acid ester/styrene copolymer, urethane elastomer, polyvinyl fluoride, vinylidene chloride/acrylonitrile copolymer, butadiene/acrylonitrile copolymer, polyamide resin, polyvinyl butyral, cellulose derivative (e.g., cellulose acetate butyrate, cellulose diacetate, cellulose triacetate, cellulose propionate, or nitrocellulose), styrene/butadiene copolymer, polyester resin, amino resin, various synthetic thermoplastic rubbers (e.g., polybutadiene, polychloroprene, polyisoprene, and styrenebutadiene copolymer) and mixtures thereof.

These thermoplastic resins are illustrated in Japanese Patent Publication Nos. 6877/62, 12328/64, 19282/64, 5349/65, 20907/65, 9463/66, 14059/66, 16985/66, 6428/67, 11621/67, 4623/68, 15206/68, 2889/69, 17947/69, 18232/69, 14020/70, 14500/70, 18573/72, 22063/72, 22064/72, 22068/72, 22069/72, 22070/72, 27886/73, U.S. Pat. Nos. 3,144,352, 3,419,420, 3,499,789, and 3,713,887.

The thermosetting or reactive resin is such that it has a molecular weight of not more than 200,000 when it is in a coating solution and that after application and drying of a coating, its molecular weight is increased infinitely due to condensation, addition or other reactions. Preferred thermoplastic or reactive resins are those which do not soften or melt until they are decomposed with heat. Specific examples are phenol-formaldehyde novolak resin, phenol-formaldehyde resol resin, phenolfurfural resin, xylene-formaldehyde resin, urea resin, melamine resin, drying oil-modified alkyd resin, phenolic resin-modified alkyd resin, maleic acid resin-modified alkyl resin, unsaturated polyester resin, epoxy resin/curing agent (e.g., polyamine, acid anhydride, or polyamide), moisture-curable isocyanate-terminated polyester resin, moisture-curable isocyanate-terminated polyether resin, polyisocyanate prepolymer (compound having three or more isocyanate groups in one molecule as obtained by reacting diisocyanate with a low molecular triol, diisocyanate trimer or tetramer), resin having a polyisocyanate prepolymer and active hydrogen (e.g., polyester polyol, polyether polyol, acrylic acid copolymer, maleic acid copolymer, 2-hydroxyethyl methacrylate copolymer, parahydroxystyrene copolymer) and mixtures thereof.

These thermosetting or reactive resins are illustrated in Japanese Patent Publication Nos. 8103/64, 9779/65, 7192/66, 8016/66, 14275/66, 18179/67, 12081/68, 28023/69, 14501/70, 24902/70, 13103/71, 22065/72, 22066/72, 22067/72, 22072/72, 22073/72, 28045/72, 28048/72, 28922/72, U.S. Pat. Nos. 3,144,353, 3,320,090, 3,437,510, 3,597,273, 3,781,210, and 3,781,211.

These binders are used independently or in admixture. They may be used together with a suitable additive. The ferromagnetic particles are mixed with the binder at a weight ratio of 8–150 parts, preferably 10–100 parts, more preferably 12–60 parts (binder) to 100 parts (ferromagnetic particles).

The magnetic coating solution can also contain an additive such as dispersant, lubricant, abrasive or antistat. Examples of the dispersant are an aliphatic acid (R$_1$COOH, R$_1$ being an alkyl or alkenyl group having 11 to 17 carbon atoms) having 12 to 18 carbon atoms such as caprylic acid, capric acid, lauric acid, myristic acid, palmitic acid, stearic acid, oelic acid, elaidic acid, linolic acid, linoleic acid or stearolic acid; a metal soap of the above aliphatic acids with an alkali metal (e.g., Li, Na or K) or an alkaline earth metal (Mg, Ca or Ba); a compound which is a fluorine-containing ester of the above aliphatic acids; an amide of the above aliphatic acids; a polyalkylene oxide alkyl phosphate ester; lecithin; and trialkyl polyolefinoxyquaternary ammonium salt (the alkyl having 1 to 5 carbon atoms, and the olefin being ethylene, propylene or the like). A higher alcohol having 12 or more carbon atoms, as well as sulfate ester can be used as the dispersant. These dispesants are used in an amount of 0.5 to 20 parts by weight for 100 parts by weight of the binder. For more details of the dispersant, see Japanese Patent Publication Nos. 28369/64, 17945/69, 7441/73, 15001/73, 15002/73, 16363/73, 4121/75, U.S. Pat. Nos. 3,387,993 and 3,470, 021.

Examples of the lubricant are fine electrically conductive particles such as those of carbon black, graphite and carbon black graft polymer; fine inorganic particles such as those of molybdenum disulfide and tungsten disulfide; fine particles of plastics such as polyethylene, polypropylene, polyethylene vinyl chloride copolymer, and polytetrafluoroethylene; alpha-olefin polymers, unsaturated aliphatic hydrocarbons which are liquid at ordinary temperatures (compounds having an n-olefinic double bond attached to the carbon atom at terminal ends, the number of carbons being about 20); and aliphatic acid esters made of a monobasic acid having 12 to 20 carbon atoms and a monovalent alcohol having 3 to 12 carbon atoms. These lubricants are used in an amount of from 0.2 to 20 parts by weight per 100 parts by weight of the binder. For details of the lubricant, see Japanese Patent Publication Nos. 18064/66, 23889/68, 40461/71, 15621/72, 18482/72, 28043/72, 32001/72, 5042/75, U.S. Pat. Nos. 3,470,021, 3,492,235, 3,497,411, 3,523,086, 3,625,760, 3,630,772, 3,642,539, "IMB Technical Disclosure Bulletin", Vol. 9, No. 7, page 779, December 1966, and "ELEKTRONIK", No. 12, page 380, 1961.

The abrasive may be of the conventional type such as particles of fused alumina, silicon carbide, chromium oxide, zircon (ZrSiO$_4$), aluminum phosphate (AlPO$_4$), oxide cerium (CeO$_2$), boron carbide (B$_4$C), aluminum borate (AlBO$_3$), spinel (MgAl$_2$O$_4$), rutile or anatase (both are TiO$_2$), diaspore (alpha-AlOOH), corundum, artificial corundum, diamond, artificial diamond, garnet, and emery (mainly consisting of corundum and magnetite). These abrasives preferably have a Mohs' hardness of 5 or more and an average particle size of 0.05 to 5 $\mu$m, more preferably 0.1 to 2 $\mu$m. These abrasives are used in an amount of from 0.5 to 20 parts by weight for 100 parts by weight of the binder. Details of the abrasive are given in Japanese Pat. Nos. 18572/72, 15003/73, 15004/73 (corresponding to U.S. Pat. No. 3,617,378), 39402/74, 9401/75, U.S. Pat. Nos. 3,007,807, 3,041,916, 3,293,066, 3,630,910, 3,687,725, British Pat. No. 1,145,349, West German Pat. (DT-PS) Nos. 853,211 and 1,101,000.

Examples of the antistat include fine electrically conductive particles such as those of carbon black, graphite and carbon black graft polymer; a natural surfactant such as saponin; a nonionic surfactant such as alkylene oxides, glycerins or glycidols; a cationic surfactant such as higher alkylamine, quaternary ammonium salt, pyridine and other heterocyclic compounds, phosphonium and sulfonium; an anionic surfactant such as carboxylic acid, sulfonic acid, phosphoric acid, or acidic group such as sulfate ester or phosphate ester group; an amphoteric surfactant such as amino acid, aminosulfonic acid, or sulfuric acid or phosphoric acid ester of aminoalcohol. The fine electrically conductive particles are used in an amount of 0.2 to 20 parts by weight for 100 parts by weight of the binder, and the surfactants are used in an amount of 0.1 to 10 parts by weight for 100 parts by weight of the binder. Certain of the fine electrically conductive particles and surfactants used as antistat are described in patents such as Japanese Patent Publication Nos. 227276/71, 24881/72, 26882/72, 15440/73, 26761/73, U.S. Pat. Nos. 2,271,623, 2,240,472, 2,288,226, 2,676,122, 2,676,924, 2,676,975, 2,691,566, 2,727,860, 2,730,498, 2,742,379, 2,739,891, 3,068,101, 3,158,484, 3,201,253, 3,210,191, 3,294,540, 3,415,649, 3,441,413, 3,442,654, 3,475,174, 3,545,974, West German Patent Application (OLS) No. 1,942,665, British Pat. Nos. 1,077,317 and 1,198,450, as well as in books such as Ryohei Oda et al., "Kaimen Kassezai no Gosei to sono Oyo (Synthesis and Applications of Surfactants)", Maki Shoten, 1964, A. M. Schwartz & J. W. Pailey, "Surface Active Agents", Interscience Publication Incorporated, 1958, J. P. Schissley, "Encyclopaedia of Surface Active Agents", Vol. 2, Chemical Publish Company, 1964, and "Kaimen Kasseizai Binran (Handbook of Surfactants)", 6th Ed., Sangyo Tosho Kabushiki Kaisha, Dec. 20, 1966. These surfactants may be used independently or in admixture. They are usually used as an antistat but they are sometimes used as an agent to provide a uniform dispersion, improved magnetic properties and lubricity, and as a coating aid.

Examples of the organic coating solvent are ketones such as acetone, methyl ethyl ketone, methyl isobutyl ketone and cyclohexanone; alcohols such as methanol, ethanol, propanol and butanol; esters such as methyl acetate; ethyl acetate, butyl acetate, ethyl lactate and glycol acetate monoethyl ether; ethers such as ether, glycol dimethyl ether, glycol monoethyl ether and dioxane; tars (aromatic hydrocarbons) such as benzene, toluene and xylene; and chlorinated hydrocarbons such as methylene chloride, ethylene chloride, carbon tetrachloride, chloroform, ethylene chlorohydrin and dichlorobenzene.

The magnetic coating solution used in this invention is prepared by mixing the ferromagnetic metal particles, binder, dispersant, lubricant, abrasive, antistat, coating solvent, etc., into a uniform dispersion. The ferromagnetic metal particles and all other ingredients are charged into a mixer simultaneously or sequentially. For example, the ferromagnetic metal particles are added to a solvent containing a dispersant and the mixture is kneaded for a certain period of time to form the desired magnetic coating solution.

Various mixers may be used to achieve thorough mixing of the magnetic coating solution. Examples are a two-roll mill, three-roll mill, ball mill, pebble mill, trommel, sand grinder, Szegvari, attritor, high-speed impeller disperser, high-speed stone mill, high-speed impact mill, disperser, kneader, high-speed mixer, homogenizer and ultrasonic disperser. For details of the kneading and dispersing technique, see T. C. Patton, "Paint Flow and Pigment Dispersion", John Wiley & Sons, as well as U.S. Pat. Nos. 2,581,414 and 2,855,156.

An aromatic polyamide film 2 to 12$\mu$ thick is used as a base in this invention. The side of the base opposite to the side having a magnetic coating may be back-coated (i.e., provided with a back coating) to prevent static buildup, transfer and wow flutter. For details of the back coating, see, for example, U.S. Pat. Nos. 2,804,401, 3,293,066, 3,617,378, 3,062,676, 3,734,772, 3,476,596, 2,643,048, 2,803,556, 2,887,462, 2,923,642, 2,997,451, 3,007,892, 3,041,196, 3,115,420, 3,166,688 and 3,761,311.

The magnetic layer formed on the base according to this invention is sent to the drying step where it is dried with an air current. The drying temperature varies with the solvent used in the coating solution, and it is usually between about 50° and 120° C., preferably between 70° and 100° C., more preferably between 80° and 90° C. The flow rate of the drying air is between about 1 and 5 kl/m$^2$. preferably between 2 and 3 kl/m$^2$. The drying period is between about 30 seconds and 10 minutes, preferably between about 1 and 5 minutes.

The surface of the dried magnetic layer is preferably subjected to the smoothing treatment. Generally, the curtain coating method is able to form a coating having good surface characteristics, but because of the natue of the magnetic coating solution, the curtain coating method alone is sometimes unable to achieve satisfactory smoothness. In addition, the surface characteristics of the magnetic recording medium must be constructed with great precision, and therefore, it is particularly desired that the surface of the dried magnetic layer be subjected to the smoothing treatment.

The smoothing treatment is usually performed by calendering or with a smoothening sheet. The calendering is preferably accomplished with a supercalendering machine consisting of a metal and a cotton roll or synthetic resin (e.g., nylon) roll. Preferably, the magnetic layer is supercalendered at a nip pressure of about 25 to 100 kg/cm$^2$, preferably between 30 and 70 kg/cm$^2$, at a temperature between about 35° and 100° C., preferably between 40° and 80° C., at a rate of 5 to 200 m/min. Higher temperatures and nip pressure cause adverse effects on the magnetic layer and non-magnetic base. If the calendering speed is less than about 5 m/min, the desired smoothing effect is not achieved, and if it is more than about 200 m/min, the calendering operation becomes difficult. For details of the supercalendering treatment, see U.S. Pat. Nos. 2,688,567, 2,998,325, 3,783,023, West German Patent Application (OLS) No. 2,405,222, Japanese Patent Application (OPI) Nos. 53631/74 and 10337/75 (the symbol OPI means an unexamined published Japanese Patent Application).

According to the method using a smoothening sheet, the magnetic layer yet to dry or solidify is brought into contact with the whole surface of a flexible sheet to give a smooth surface to the layer.

This invention is hereunder described in greater detail by reference to the following examples which are given here for illustrative purposes only and are by no means intended to limit the scope of the invention. In the examples, all parts are by weight.

EXAMPLE 1

A group of magnetic tape samples each consisting of a polyethylene terephthalate (PET) film base having a magnetic coating thereon were prepared. Another group of magnetic tape samples were prepared which were the same as the first group of samples except that a back coating 0.7$\mu$ thick having the composition indicated in Table 1 was formed on the side of the base opposite to the side coated with the magnetic layer. All samples had a total tape thickness of 15.5$\mu$ or less, but they had varying values of frictional coefficient $\mu_B$ on the side opposite to the side having the magnetic coating and varying values of tape stiffness $S_{TD}$ in transversal direction. A tape damage test was conducted with these tape samples that were caused to run on a video tape recorder (HR 3600 of Victor Company of Japan, Ltd.). The characteristics of the samples tested and the results of the test are given in Table 2 below. Samples Nos. 1 to 5 shown in Table 1 had no back coating and achieved high $\mu_B$ values, whereas Samples Nos. 6 to 10 had a back coating and achieved low $\mu_B$ values.

TABLE I

| | Composition of Test Samples | | |
|---|---|---|---|
| Sample No. | Magnetic Layer | Back Coating | Base |
| 1 | | | |
| 2 | Ferromagnetic powder | | |
| 3 | (Fe$_2$O$_3$) 300 parts | | |
| 4 | Vinyl chloride/ hydroxyethyl acrylate/ methacrylic acid | No back coating | |
| 5 | (mol. ratio = 90:5:5) | | |
| 6 | 60 parts | | PET |
| | Urethane resin 20 parts | | |
| 7 | Lecithin 2 parts | (Composition of back coating) | |
| 8 | Silicone oil 1.5 parts | Nitrocellulose 30 parts | |
| 9 | | Polyurethane resin 15 parts | |
| 10 | | Polyisocyanate 25 parts | |
| | | CaCO$_3$ 150 parts | |

TABLE 2

| | Results of Tape Damage Test | | | |
|---|---|---|---|---|
| Sample No. | Tape Thickness ($\mu$m) | Presence of Back Coating | $\mu_B$ | $S_{TD}$ | Tape Damage* Resistance |
| 1 | 14.2 | No | 0.60 | 2.6 | D |
| 2 | 14.4 | No | 0.59 | 3.1 | D |
| 3 | 13.8 | No | 0.55 | 3.1 | D |
| 4 | 15.5 | No | 0.65 | 3.9 | D |
| 5 | 15.5 | No | 0.61 | 5.4 | C |
| 6 | 15.5 | Yes | 0.30 | 3.5 | B |
| 7 | 15.3 | Yes | 0.30 | 4.3 | B |
| 8 | 15.5 | Yes | 0.29 | 4.5 | B |
| 9 | 15.5 | Yes | 0.26 | 5.4 | A |
| 10 | 15.5 | Yes | 0.28 | 6.0 | A |

*The resistance to side edge bending during tape unloading is rated as follows:
A: No side edge bend occurred.
B: Small side edge bend occurred that would cause no problem for practical purposes.
C: A side edge bend occurred that would cause a problem for practical purposes.
D: A side edge bend occurred that was greater than that in the C-rated sample and which was unacceptable in practical applications.

As shown by Table 2, Samples Nos. 1 to 5 having no back coating were rated D or C in the evaluation of their resistance to tape damage. This is because their $\mu_B$ values were as high as 0.55 to 0.61. The difference between the ratings D and C was due to the difference in $S_{TD}$ that was a little higher in the C-rated sample than in the D-rated samples. Samples Nos. 6 to 10 with a back coating were rated A or B. This is because the back coating reduced the $\mu_B$ value appreciably. The difference between the ratings A and B was due to the fact that the A-rated samples achieved a little lower $\mu_B$ value and a higher $S_{TD}$ value than the B-rated samples.

EXAMPLE 2

The test in Example 1 showed that tape samples having small $\mu_B$ and great $S_{TD}$ were highly resistant to tape damage. To make a closer study of this finding, twenty tape samples were prepared using a magnetic layer having the composition indicated in Table 1, a back coating whose composition is also indicated in Table 1, and PET base films having various values of Young's modulus in transversal direction. These tapes were subjected to a tape damage test in the same manner as in Example No. 1. The characteristics of the samples tested and the test results are identified in Table 3.

Figure 3:
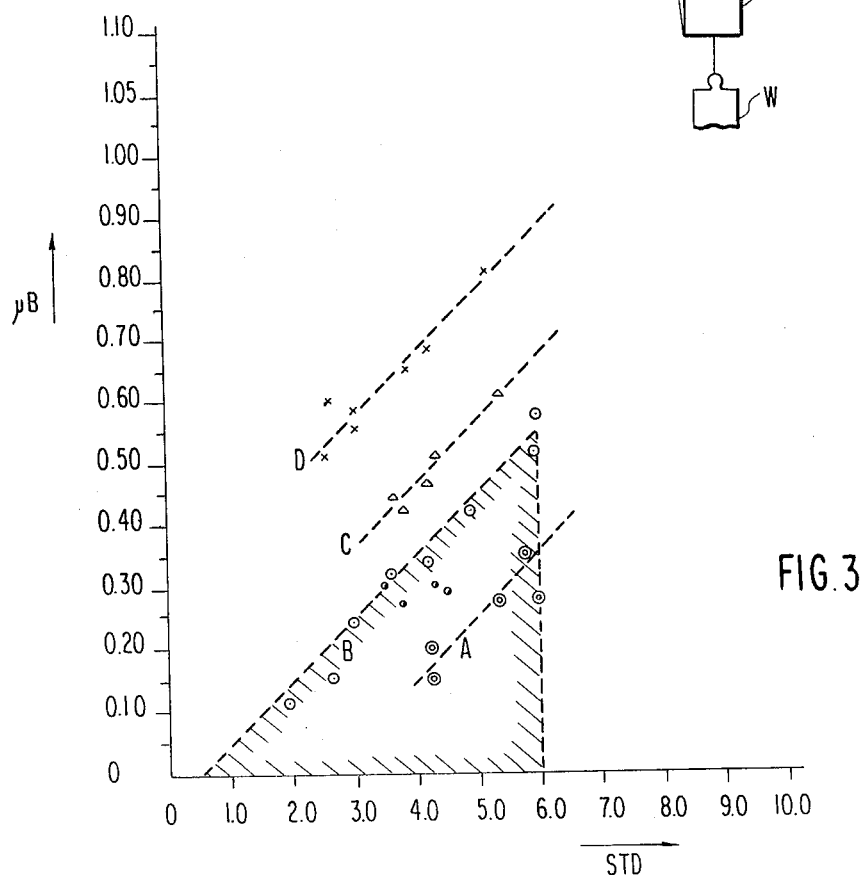
FIG. 3 is a graph showing the relation between the coefficient of friction ($\mu_B$) in transversal direction against the axial direction of loading post and $S_{TD}$, wherein the symbols A to D are keyed to the ratings A to D used in Examples 1 and 2.

The data of Table 3 is depicted in FIG. 3 in terms of the relation between $\mu_B$ and $S_{TD}$. The severity of the tape damage is represented by the straight lines A, B, C and D in the Figure. The samples having $\mu_B$ values smaller than the points on the line A are rated A, and those having $\mu_B$ values smaller than the points on the line B and greater than the points on the line A are rated B. The C- and D-rated samples are defined in a similar manner. The partially hatched area in FIG. 3 includes both A- and B-rated samples which incurred small tape damage and presented no problem for practical purposes. The line B is represented by the following formula:

$$\mu_B = 0.1 S_{TD} - 0.05 \; (0.5 < S_{TD} \leq 6.0)$$

Therefore, the area where the $\mu_B$ values are smaller than the points on the straight line represented by this formula corresponds to the partially hatched area in FIG. 3, and only small tape damage is expected to occur in this area.

TABLE 3

Results of Tape Damage Test

| Sample No. | Tape Thickness (μm) | Presence of Back Coating | $\mu_B$ | $S_{TD}$ | Tape Damage* Resistance |
|---|---|---|---|---|---|
| 1 | 15.4 | No | 0.81 | 5.2 | D |
| 2 | 15.1 | No | 0.68 | 4.2 | D |
| 3 | 14.7 | No | 0.51 | 2.6 | D |
| 4 | 15.2 | No | 0.51 | 4.4 | C |
| 5 | 15.0 | No | 0.47 | 4.2 | C |
| 6 | 15.0 | No | 0.42 | 3.8 | C |
| 7 | 14.9 | No | 0.44 | 3.6 | C |
| 8 | 15.5 | Yes | 0.57 | 6.0 | B |
| 9 | 15.5 | Yes | 0.51 | 5.9 | B |
| 10 | 15.3 | Yes | 0.42 | 4.9 | B |
| 11 | 15.2 | Yes | 0.34 | 4.2 | B |
| 12 | 15.1 | Yes | 0.32 | 3.6 | B |
| 13 | 15.1 | Yes | 0.27 | 3.8 | B |
| 14 | 14.5 | Yes | 0.24 | 3.0 | B |
| 15 | 14.2 | Yes | 0.15 | 2.6 | B |
| 16 | 13.9 | Yes | 0.11 | 1.9 | B |
| 17 | 15.5 | Yes | 0.36 | 5.8 | A |
| 18 | 15.4 | Yes | 0.28 | 5.3 | A |
| 19 | 15.3 | Yes | 0.20 | 4.2 | A |
| 20 | 15.3 | Yes | 0.15 | 4.2 | A |

*For the rating of tape damage resistance, see Table 2.

While the invention has been described in detail and with reference to specific embodiments thereof, it will be apparent to one skilled in the art that various changes and modifications can be made therein without departing from the spirit and the scope thereof.

What is claimed is:

1. A magnetic recording medium comprising a base, a magnetic layer formed thereon and a back coating layer on the surface of the base opposite and magnetic layer, the coefficient of friction ($\mu_B$) of the surface opposite to the magnetic layer in transversal direction against the axial direction of loading post being under the straight line represented by the following formula, with the proviso that $\mu_B$ is less than or equal to 0.30, and the total thickness of the medium being 15.5 μm or less:

$\mu_B = 0.1 S_{TD} - 0.05$ (wherein $S_{TD}$ is the stiffness of
the medium in transversal direction and
$0.5 < S_{TD} \leq 6.0$).

2. A magnetic recording medium, as claimed in claim 1, wherein said magnetic layer comprises ferromagnetic powders selected from the group consisting of ferromagnetic iron oxide, ferromagnetic chromium oxide and ferromagnetic alloy powders.

* * * * *